United States Patent [19]

Gerhardson

[11] 4,401,615

[45] Aug. 30, 1983

[54] METHOD OF MOLDING A PERFORATED ARTICLE

[75] Inventor: Gunnar D. Gerhardson, Skogsbacken, Sweden

[73] Assignee: AB Jonkoping-Vulcan, Sweden

[21] Appl. No.: 268,343

[22] Filed: May 29, 1981

Related U.S. Application Data

[63] Continuation of Ser. No. 18,141, Mar. 7, 1979, abandoned.

[30] Foreign Application Priority Data

Mar. 14, 1978 [SE] Sweden .............................. 7802873

[51] Int. Cl.[3] .............................................. B29J 5/00

[52] U.S. Cl. .................................. 264/119; 264/120; 264/109

[58] Field of Search ....................... 264/109, 119, 120

[56] References Cited

U.S. PATENT DOCUMENTS

| | | | |
|---|---|---|---|
| 2,571,334 | 10/1951 | Browne | 264/109 |
| 3,238,281 | 3/1966 | Kato | 264/109 |
| 3,261,897 | 7/1966 | Munk | 264/109 |
| 3,342,917 | 9/1967 | Laskiewicz | 264/109 |

*Primary Examiner*—James R. Hall

*Attorney, Agent, or Firm*—Lerner, David, Littenberg, Krumholz & Mentlik

[57] ABSTRACT

A method of molding a perforated article involves supplying a formable material to a preforming chamber where the material is compressed so that it substantially assumes the cross-sectional shape of the preforming chamber. The formable material is then transferred under compressive forces to a molding chamber, which has a volume less than the volume of the preforming chamber and a shape which substantially matches the shape of the perforated article to be molded. The formable material is then heated in the molding chamber to cure it and thereby form the perforated article.

5 Claims, 2 Drawing Figures

METHOD OF MOLDING A PERFORATED ARTICLE

This is a continuation, of application Ser. No. 018,141, filed Mar. 7, 1979 abandoned.

FIELD OF THE INVENTION

The present invention relates to a method of producing holes in bodies of formable chips or similar material. The term "formable chips" refers to chips or flakes of cellulose or corresponding material, which has been impregnated with a binder for making the material formable. This binder may be, for example, urea resin, melamine, wax emulsion, etc.

BACKGROUND OF THE INVENTION

When attempting to produce holes, whether they be through-holes or merely superficial holes in bodies manufactured of formable chips or the like, the low flow characteristics of the bulk of the formable chips causes problems. A conventional pressure molding technique is impractical, since the bulk of the formable chips aggregate and make it more or less impossible to press the bulk into the mold, at least to an extent sufficient for performing a successful molding operation.

In the past, the above-described problem has been avoided by forming holes in bodies of formable chips after the molding thereof. Alternatively, such holes have been entirely omitted.

SUMMARY OF THE INVENTION

In accordance with the present invention, it has been found that hole forming in connection with the pressure molding of formable chips or corresponding material having low flow characteristics is possible, provided certain steps are followed. These steps include a preorientation of the body of formable chips before the final pressing of the bulk into a mold. This preorientation should also be such that it orients the material into the same basic shape the material will assume in the mold, i.e., the preorientation contributes to a preshaping or preforming of the bulk of the formable chips.

The steps involved in connection with the present invention, which is more clearly defined in the accompanying claims, are further described in the following description of a preferred embodiment, where the present invention is applied to make a "spund", i.e., an end plug of a support roll for heavy paper rolls or the like.

BRIEF DESCRIPTION OF THE DRAWINGS

In the accompanying drawings, there is shown.

DESCRIPTION OF A PREFERRED EMBODIMENT

Figure 1:
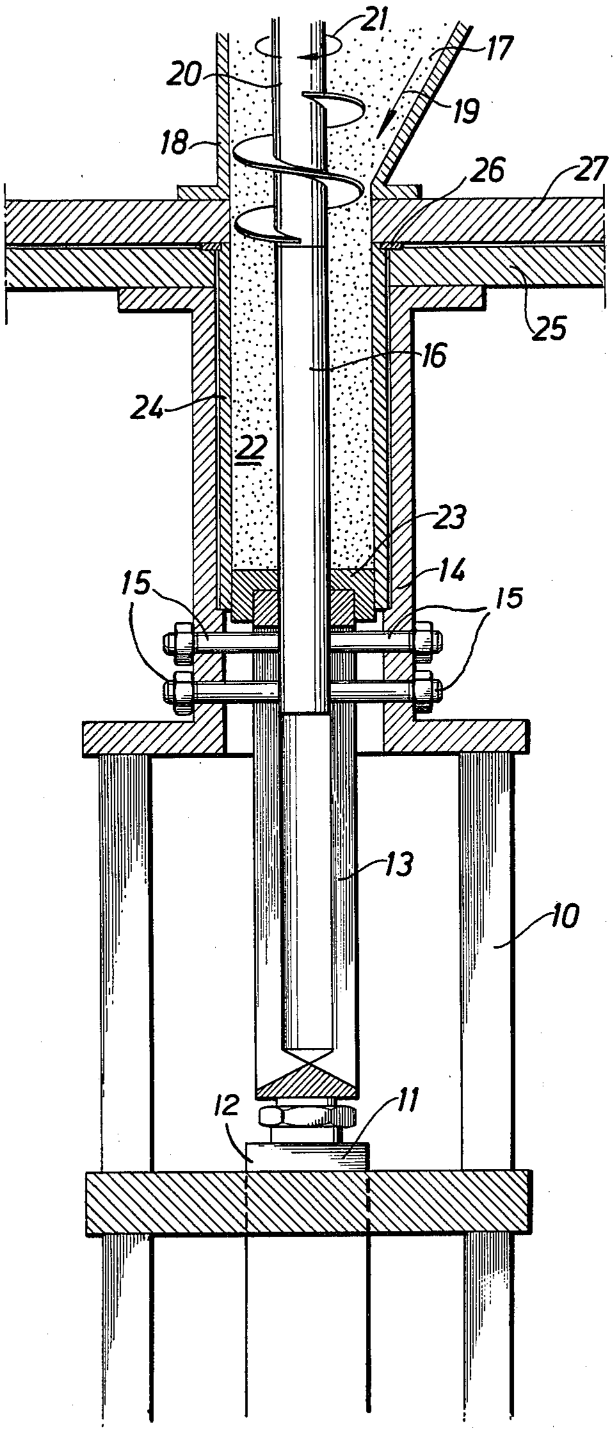
FIG. 1, which is a partial cross-sectional view through an apparatus for manufacturing end plugs, where a supply funnel is located in a position for supplying formable chips, and FIG. 2, which shows a cross-sectional view similar to FIG. 1, but where a forming tool or mold has replaced the supply funnel of FIG. 1.

In the figures, reference numeral 10 generally relates to a stationary stand. The stand 10 supports a hydraulic plunger and cylinder device 11. A longitudinally slotted extension rod 13 is attached to a movable plunger rod 12 of the device 11. A longitudinal slot extends radially through opposite sides of the extension rod 13 and two pairs of bolts 15, which are rigidly attached to a mid-part 14 of the stand 10, extend into this slot from opposite sides of the extension rod 13. The bolts 15 anchor the lower end of a preforming rod 16 in the interior of the mid-part 14, which forms a temporary storing or preforming chamber 22 for formable chips 17 supplied from a supply funnel 18 in the direction of arrow 19. The chips 17 are supplied to the preforming chamber 22 by a feed screw 20 rotating in the direction of arrow 21. The lower end of the feed screw 20 is located adjacent to the top of the preforming rod 16.

Figure 2:
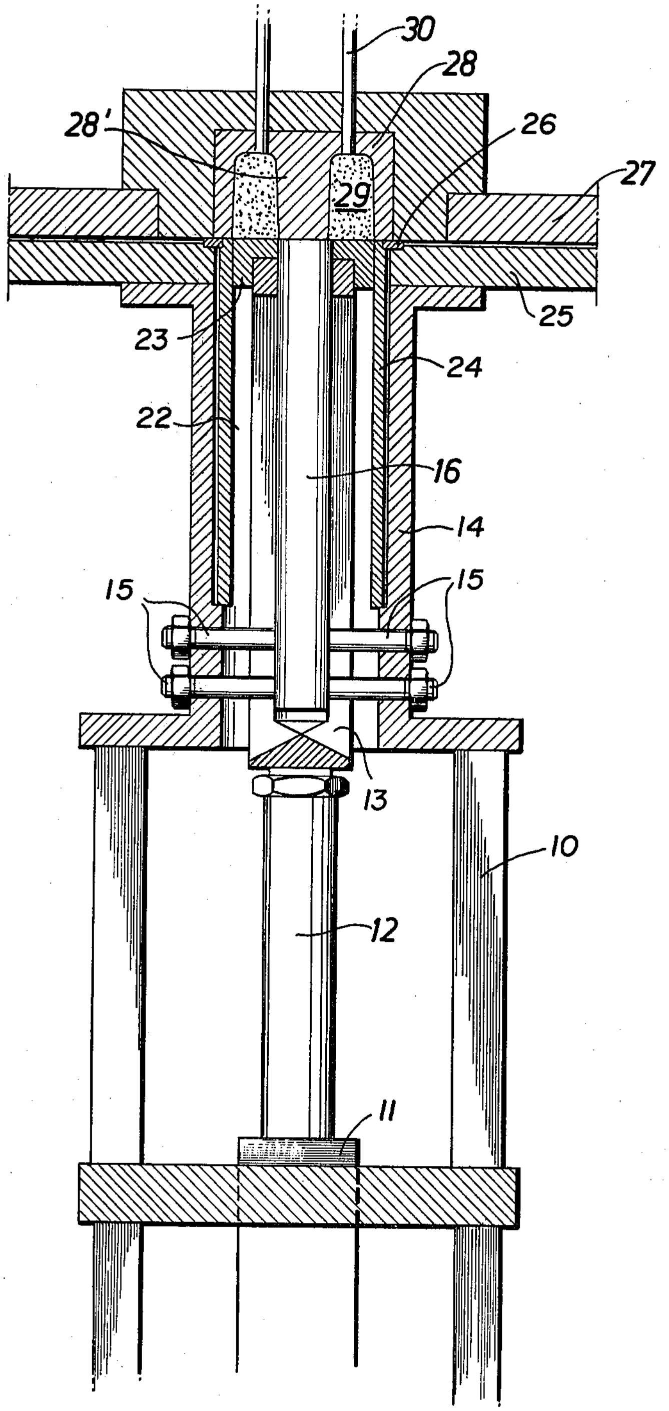

The bottom of the preforming chamber 22 is defined by a plunger 23, which is attached to the extension rod 13 for reciprocating movement together with the extension rod 13 between the position shown in FIG. 1 and the position shown in FIG. 2. The sides of the preforming chamber 22 are defined by a liner 24.

The top end of the stationary mid-part 14 is rigidly attached to a lower plate 25 which is provided with rails 26. The rails 26 facilitate the sliding movement of an upper plate 27, which is rigidly attached to the supply funnel 18, relative to the lower plate 25. The upper plate 27 also supports a mold 28 (see FIG. 2), which in the embodiment shown in FIG. 2 is designed to produce an end plug 29 having a through-hole. A central portion 28' of the mold 28 is located adjacent to the top of the preforming rod 16 and forms a more or less continuous extension of the rod 16.

In FIG. 2, the upper plate 27 has been moved to a "compression position", i.e., a position in which the mold 28 is located directly above the preforming chamber 22 and the plunger 23. In FIG. 1, the upper plate 27 is in another position in which the mold 28 has been replaced by the supply funnel 18 so that a pair of ejectors 30 (see FIG. 2) are free to eject the formed and finished end plug 29 from the mold 28, which is no longer located directly above the preforming chamber 22 and the plunger 23.

In operation, the preforming chamber 22 is filled with the desired material, e.g., in this case so-called formable chips having low flow characteristics. The filling is accomplished by the feed screw 20, which functions to compress the formable chips delivered to the performing chamber 22. During the filling operation, the plunger 23 is in its retracted position (see FIG. 1).

The preforming chamber 22 is so dimensioned that for the particular mold 28, the supplied amount of formable chips forms the end plug 29 with a desired density and strength. The density and strength of the end plug 29 are also, of course, dependent upon the value of the compressive pressures attainable by the plunger 23.

When the preforming chamber 22 has been filled up to the desired level, the plunger 23 starts its upwards compression stroke. Prior to the further compression of the formable chips by the plunger 23, the cross-sectional bulk of the formable chips is given a preorientation corresponding generally to the desired shape of the end plug 29. This preorientation results from the registry of the preforming rod 16 and the central portion 28' of the mold 28. In the embodiment shown, the preforming rod 16 also forms a more or less continuous extension of the central portion 28' of the mold 28. Due to this preorientation, it is possible to complete the compression of the bulk of the formable chips and its transfer into the mold 28 without aggregation or other interferences.

When the compression has reached the stage illustrated in FIG. 2, the bulk of the formable chips must remain in the mold 28 for a sufficient length of time to permit proper curing, preferably by supplying heat, before ejection by the ejectors 30. During such curing, the preforming chamber 22 is preferably refilled in preparation for another molding operation.

Although a single preferred embodiment of the invention has been described, it should be understood that variations and alternative embodiments are possible within the scope of the following claims. Thus, it is not absolutely necessary to carry out the preorientation operation along the entire length of the preforming rod 16. Rather, preorientation can be limited to the upper part of the preforming chamber 22. It is, of course, also possible to use several preforming rods or the like, depending upon the desired hole configuration of the molded product.

I claim:

1. A method of molding a perforated, coherent article from a formable material, including flakes of cellulose which have been impregnated with a binder, comprising:

a. supplying said formable material to an elongated preforming chamber formed between inner and outer sidewalls, said performing chamber having a predetermined volume and cross-sectional shape;

b. compressing said formable material in said preforming chamber so that said formable material substantially assumes said cross-sectional shape of said preforming chamber;

c. transferring said formable material from said preforming chamber to a molding chamber, which has a shape substantially identical to the shape of said article and a volume less than said volume of said preforming chamber, at least a portion of said molding chamber having a cross-sectional shape substantially identical to said cross-sectional shape of said preforming chamber;

d. compressing said formable material as it is being transferred from said preforming chamber to said molding chamber while maintaining the general cross-sectional shape assumed by said formable material when in said preforming chamber, whereby said formable material substantially assumes the shape of said article; and e. heating said formable material in said molding chamber to an extent sufficient to cure said formable material and complete the formation of said article.

2. A method according to claim 1 wherein said formable material is supplied to said preforming chamber from a supply chamber.

3. A method according to claim 2, wherein said molding chamber and said supply chamber successively and alternately communicate with said preforming chamber.

4. A method according to claim 1, wherein said preforming chamber and said molding chamber have generally annular cross-sectional shapes.

5. A method according to claim 1, wherein said formable material is compressed as it is supplied to said preforming chamber.

* * * * *